Aug. 5, 1958 T. H. GRIEGER 2,846,555
ICING-CONDITION DETECTING INSTRUMENT
Filed May 23, 1955 3 Sheets-Sheet 1

INVENTOR
Thomas H. Grieger
BY Stevens, Davis, Miller & Mosher
ATTORNEYS

Aug. 5, 1958 T. H. GRIEGER 2,846,555
ICING-CONDITION DETECTING INSTRUMENT
Filed May 23, 1955 3 Sheets-Sheet 2

INVENTOR
Thomas H. Grieger

BY Stevens, Davis, Miller & Mosher
ATTORNEYS

Aug. 5, 1958  T. H. GRIEGER  2,846,555
ICING-CONDITION DETECTING INSTRUMENT
Filed May 23, 1955  3 Sheets-Sheet 3

INVENTOR
*Thomas H. Grieger*

BY *Stevens, Davis, Miller & Mosher*
ATTORNEYS

United States Patent Office 2,846,555
Patented Aug. 5, 1958

2,846,555

ICING-CONDITION DETECTING INSTRUMENT

Thomas H. Grieger, Baltimore, Md.

Application May 23, 1955, Serial No. 510,383

4 Claims. (Cl. 219—19)

This invention relates to an instrument for the detection of ice or an icing condition on a vehicle. More particularly, it relates to an instrument which will automatically, and accurately, monitor the formation of ice and the operation of an icing protective system. The instrument is particularly adapted to be used to respond to ice forming on aircraft and/or its components but it may, of course, be used on any vehicle or installation, subject to icing, such as icing in wind tunnels or in any other application wherein it is desirable to detect and remove ice formations or to measure the rate at which icing takes place on such installations.

Aircraft flying through clouds composed of supercooled water droplets are subject to the hazard of icing at all times when in contact with these clouds containing such droplets. Due to the great range and altitude of all types of aircraft now in use, the problem of detecting and preventing the formation of ice on the aircraft or its components is not seasonal since ice can form on an aircraft at any time that the proper conditions are encountered. The ice-protection system of an aircraft, when in operation, consumes energy in sufficient quantity that it has the effect of a reduction in the aircraft performance and for this reason it is not feasible to have the ice-protection system on at all times. In addition, the ice-protection system of high performance aircraft requires such a great concentration of energy that unless the operation of the system is rigidly confined to actual icing conditions, local overheating may threaten structural integrity or cause decomposition of some heat sensitive materials. Furthermore, the failure to place the ice-protection system in operation as soon as the maximum allowable thickness of ice has formed, will not only jeopardize the performance and safety of the aircraft, but this delayed operation may result in run-back icing, which the conventional ice-protection system has no power to remove. Icing conditions occur at night as well as during daylight hours, and with rapid changes in altitude now possible with present-day aircraft, as well as flight in cloud strata of widely varying temperatures within such brief intervals of time, accurate forecasting of ice or icing conditions is impossible and a hazardous degree of icing can quickly take place. It is obviously impractical to rely upon the pilot or crew to detect icing conditions and put the system into operation at the proper time. Ice detecting instruments must, therefore, be used. However, no known instrument will detect the hazardous icing condition, or rate of icing, which will not also respond to wind-blown snow or dust. Nor does an instrument exist that will, prior to this invention, rearm itself immediately after reacting to energize the aircraft ice protection system.

It is an object of this invention to provide an instrument that is capable of detecting a predetermined amount of ice and, as a result, set in operation the ice protection system.

It is another object of this invention to provide an instrument which can be integrated with an ice-protection system which will reduce to a minimum the total amount of energy consumed in such ice-protection system of the aircraft.

It is another object of this invention to provide an ice-protection system including an instrument which will operate the system only under actual icing conditions and reduce the hazard of local overheating, which may cause weakening of structure or decomposition of some heat sensitive materials.

It is another object of this invention to provide an ice-protection system which will relieve the pilot of the responsibility of ice detection and preclude delay of operation of a system that may result in run-back icing.

It is another object of this invention to provide an ice detection system including an instrument which will not react to water or to wind-blown snow or dust.

It is another object of this invention to provide an ice detecting system including an instrument which will rearm itself immediately after reacting to remove ice through energizing the ice-protection system.

It is another object of this invention to provide an ice-protection system including an instrument which is responsive to ice which forms either on the front or upon the sides of the aerodynamic body.

It is another object of this invention to provide an instrument for an ice-protection system in which the exposed parts are small enough for installation on the fuselage, wing surfaces, or within engine air inlet ducts, air ducts in wind tunnels, etc., without impairing the function thereof.

It is a further object of this invention to provide an instrument for an ice-protection system which is not affected by the altitude or any of the forces which may be encountered in the normal operation of an aircraft.

It is a further object of this invention to provide a system including an instrument which will, in addition to monitoring the formation of ice and putting the system in operation at the proper time, also give an indication of the icing rate. In other words, the instrument can act as an icing rate meter and a protection system monitor.

It is a further object of this invention to provide an instrument for an ice-protection system that is unresponsive to thicknesses of ice that are tolerable to the protected vehicle thus contributing to the over-all economy of operation of the system.

Further and other objects will be apparent from the description of the accompanying drawings of the invention, in which like numerals refer to like parts.

Figure 1:
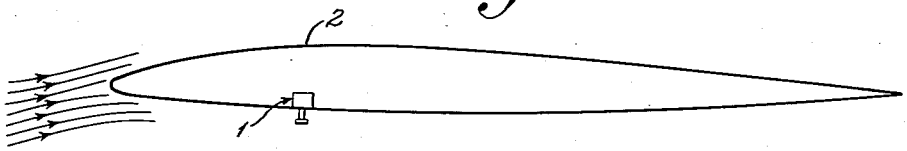
Figure 1 is a diagrammatic sketch showing a possible location of the ice detection instrument on an aircraft wing.

The ice-protection system of an aircraft or vehicle, or any installation requiring ice-protection consists of, for example in aircraft, de-icing boots of the inflatable pneumatic type, electric de-icers which can be wire-inserted rubber, or conductive rubber or other types, mounted similarly to the de-icing boots, or of the heated air method in which ducts bear heated air to critical portions of the aircraft along the surface of which the air is distributed in a manner designed to prevent the formation of ice thereon.

Since all types of ice-protection systems place a load upon the aircraft and detract from either its power or performance, it is important that such system be placed in operation only in the actual event of an ice formation which causes the system to operate upon the aircraft entering an area of icing conditions. Such an instrument is shown in the drawings.

Figure 2:
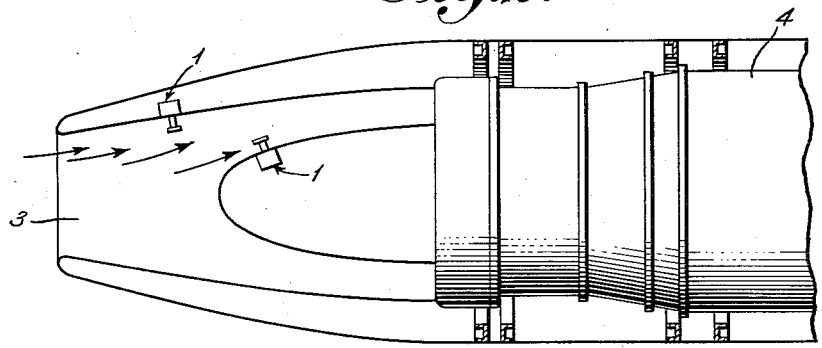
Figure 2 is a diagrammatic sketch of a jet engine showing two alternate locations of the instrument in the intake of the jet engine.

In Figure 1, detector unit 1 is shown mounted on wing 2. It can be mounted in any convenient place on an aircraft wing as long as it is exposed to the slip stream. In Figure 2, it is shown mounted within the air inlet duct 3 of a jet engine generally indicated as 4. The elements of unit 1 extend such a short distance into the air stream and are of such small size that they do not interfere appreciably with the movement of the air through the inlet duct.

Figure 3:
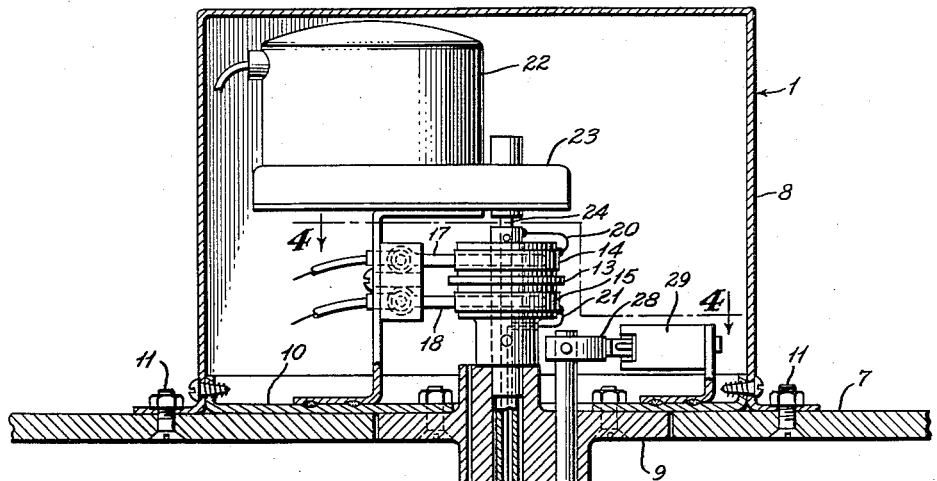
Figure 3 is an enlarged cross-sectional view of the instrument shown in Figures 1 and 2.

Unit 1, shown in enlarged view in Figure 3, consists of a mast 5 having mounted for rotation thereon a disk 6, which are the only portions that project outside of the structure of the surface on which it is mounted. Skin 7 represents the surface on which unit 1 is mounted. Mast 5 has a mounting flange 9 which is secured to a base 10. Base 10 is secured to housing 8, which is in turn secured by bolts 11 to the mounting surface 7. The essential elements of the ice detector unit are mast 5, which supports disk 6 in spaced relation to surface 7. Hollow shaft 12 supports disk 6 on the outer end of mast 5 and has at the other end a commutator 13 on which are mounted slip rings 14 and 15 to supply power to a heating element 19 in disk 6. Wire 20 is shown extending diagrammatically between ring 14 and the structure of hollow shaft 12. Wire 21 is shown more or less diagrammatically connecting ring 15 with the wires that extend through hollow shaft 12 to heater element 19 and disk 6. Motor 22, through gear box 23, causes shaft 24 to rotate at a predetermined low speed. A speed of about five revolutions per minute is generally satisfactory. Shaft 24 is coupled to hollow shaft 12 and drives disk 6 at the same speed.

Mast 5 also carries another shaft 25 spaced from shaft 12 and downstream shaft 12. On the outer end of shaft 25 there is a feeler 26 having a surface 27 that extends generally parallel to the periphery of disk 6 and is spaced therefrom a predetermined amount and also having a portion 27a which is parallel to the innermost plane surface of the disk and spaced therefrom a predetermined amount. On the inner end of shaft 25 is mounted a cam 28 which is intended to actuate a microswitch 29.

Figure 4:
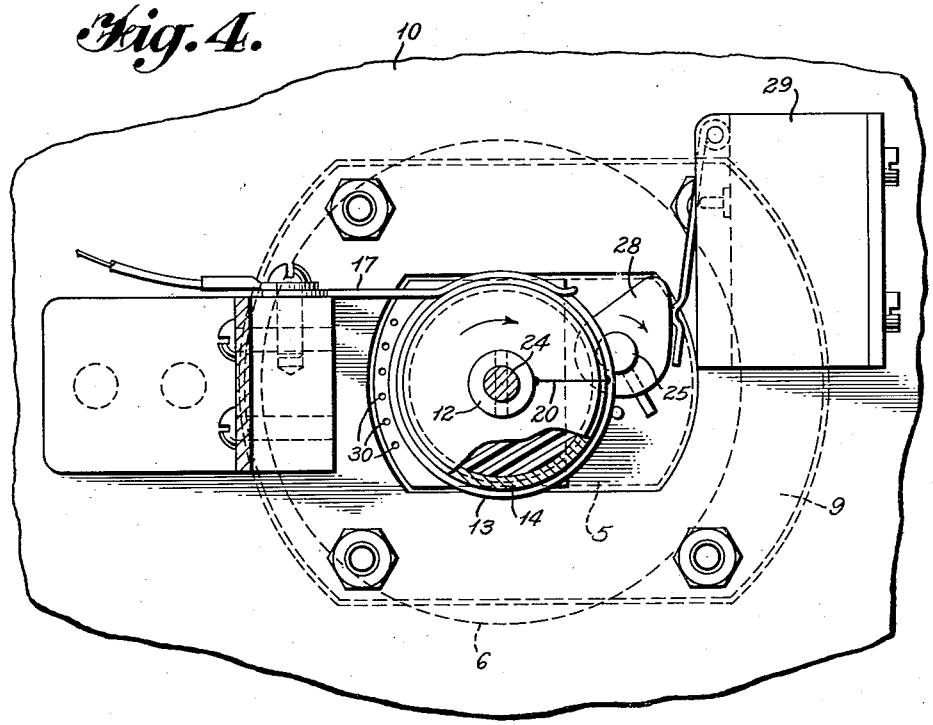
Figure 4 is a sectional view taken on the line 4—4 of Figure 3.

Figure 4 shows a section of Figure 3 taken on the line 4—4 to show the arrangement of the parts described above, namely, commutator 13 mounted on shaft 12, which is driven by shaft 24, rotated by motor 22, and the contact of finger 17 on commutator ring 14, together with the electrical connection of ring 14 and shaft 12. In this view is also shown the relative position of shaft 12 and shaft 25 and the location of cam 28 with microswitch 29.

Figure 5:
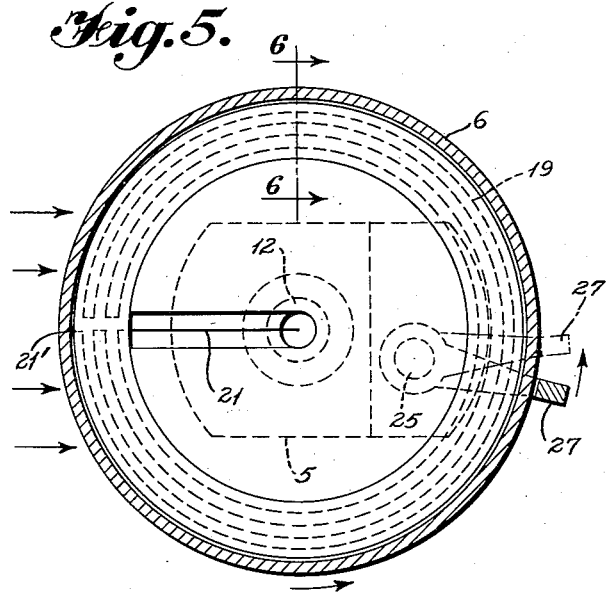
Figure 5 is an enlarged sectional view taken on the line 5—5 of Figure 3.

Figure 5 is an enlarged section taken on the line 5—5 of Figure 3 and shows disk 6 hollowed out to receive a heater element 19. Heater element 19 (shown at the outer periphery of disk 6) receives its electrical power from wire 21 extending through hollow shaft 12 and ground connection 21'.

Figure 6:
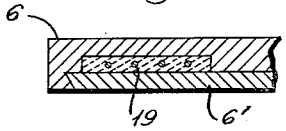
Figure 6 is a fragmentary sectional view taken on the line 6—6 of Figure 5.

In Figure 6, a fragmentary section taken on the line 6—6 of Figure 5, heater element 19 is shown embedded in disk 6 and held in place by cover plate 6', which is swedged or brazed or otherwise secured in disk 6. It is necessary that disk 6 present a smooth outer surface to the air stream and have embedded therein a heater element 19 which is capable, upon being actuated, of de-icing disk 6.

Returning to Figure 5, feeler surface 27 is shown in its relationship to the periphery of disk 6. An arrow on the lower side of Figure 5 indicates the direction of rotation of disk 6. As disk 6 rotates slowly in a moving icing atmosphere there will occur a generally uniform deposition of ice, more frequently forming upon the peripheral edge but sometimes tending to form upon the disk plane surfaces in close proximity to the peripheral edge during a particular type of icing condition which is extremely hazardous to aircraft. As the ice builds up to a thickness, determined by either the gap between the periphery of disk 6 and feeler surface 27 or between the disk plane surface and feeler surface 27a, feeler 26 will be carried around in the same direction as the rotation of disk 6 to a position shown at 26'. The rotation of feeler 26 to the position of 26' will cause rotation of shaft 25 and cam 28, which in turn will actuate microswitch 29. Before describing the results of the actuation of microswitch 29, it is necessary to describe briefly the mast heater.

Figure 7:
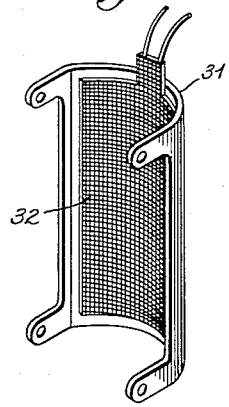
Figure 7 is a perspective view of the mast heater.
Figure 8:
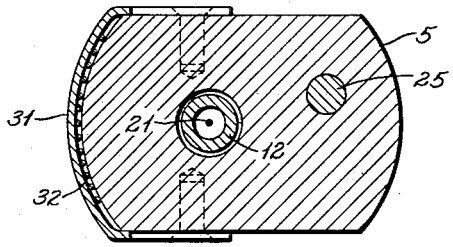
Figure 8 is a sectional view through the mast, showing the location and mounting of the heater element.
Figure 9:
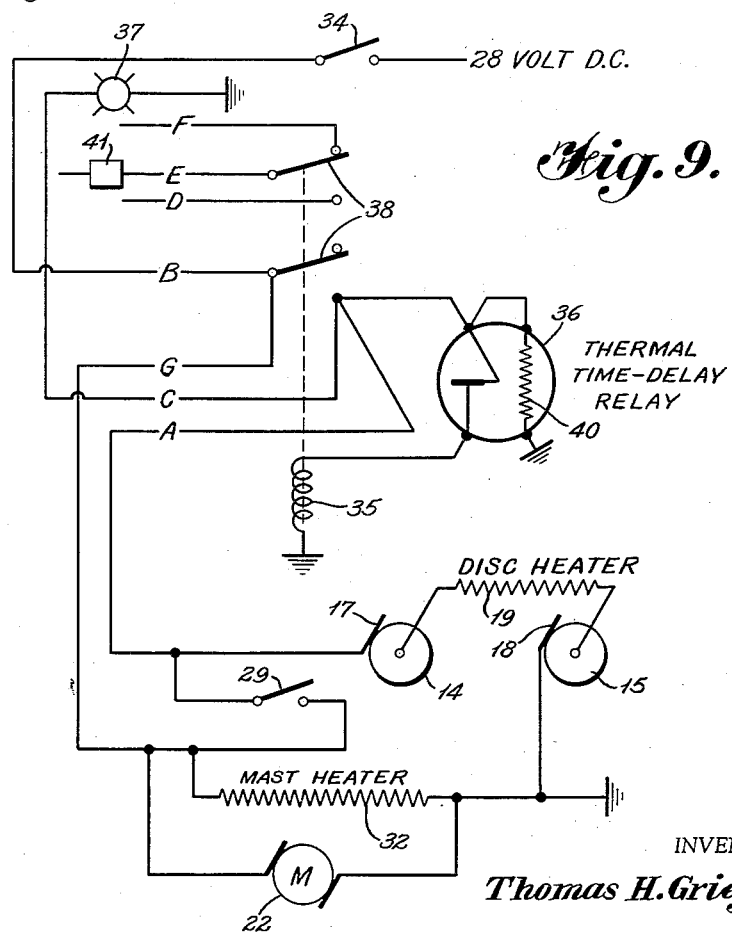
Figure 9 is a diagrammatic view of the electrical connections of the instrument in the system.

It is necessary to prevent the accumulation of ice on the mast and therefore, mast 5 must be heated continuously in order to evaporate the intercepted icing droplets. The anti-icing of mast 5 can be accomplished in one of two ways. In Figure 3, holes 30 are shown extending through the leading edge of the mast through which heating element wires may be run to accomplish the localized heating in the leading edge of the mast for anti-icing purposes; or, as is shown in Figures 7 and 8, a removable heater 31 having wires 32 embedded or secured therein may be mounted on the leading edge of mast 5. Figure 9 shows the system into which the above-described components of the ice detecting unit are connected. If switch 34 should be closed, when in flight, it would be advisable to prepare the airplane system for automatic operation. The closing of switch 34 energizes motor 22 to drive disk 6. It also energizes the heating element 32 of mast heater 31. When an icing condition is encountered and a deposit of ice has been accumulated on disk 6 such that will actuate feeler 27 and move it to position 27', switch 29 will be closed. Upon the closing of switch 29, disk heater 19 will be energized, as will be heater element 40 of a time delay relay 36 to close contact 38.

Upon the closing of contact 38, a control circuit will be closed through lines D and E which will activate the ice-protection system. The ice-protection system may be of any type, such as the well-known pneumatic boot type, or it may be an electrical system involving wire-inserted rubber blankets or other surface heating components, or it may be a type which utilizes the forced circulation of heated air through passages formed in the wing leading edge structure to provide the heated surfaces required for protection. Operation of these systems may be either on a uniformly intermittent basis (de-icing) or continuous (anti-icing).

As noted above when switch 29 is closed, the disk heater element 19 is also energized, as is also the thermal time delay relay heater element 40. Heat is applied to the disk for a length of time determined by the thermal time delay relay 36 which in the present design has been found to be approximately eight seconds. After this time, the disk is completely de-iced and switch 29 is opened and the time delay relay re-sets itself. Contacts 38 then open, signal light 37 goes off and the ice-protection system is turned off. As quickly as disk 6 again coats with ice and actuates the system, the disk de-icing system goes into operation again. Cyclic operation of the disk de-icing system is thus achieved, the cycle rate depending upon the rate of icing; therefore the instrument described and illustrated can be said to be not only a monitor for the operation of the ice-protection system but also an instrument to determine the rate of icing.

It should be noted that by varying the setting of the gap between surface 27 of feeler 26 and the periphery of disc 6 or of the gap between surface 27a of feeler 26 and the side of disk 6 the instrument can be made responsive to any type of ice formation and to whatever thickness desired which will be most suitable for the ice-protection requirements of the vehicle. Since the instrument is designed to divest itself of ice and rearm itself to again respond to the same accumulation of ice as it did initially, the rate of response can be either observed or recorded and thus the instrument can act as an icing rate meter. It should also be noted that when the instrument is used as an ice-protection system operational monitor, the instrument would, upon response to an icing condition, turn on the protection system and simultaneously energize an auxiliary type time delay device 41 which would cause the ice-protection system to remain in operation for a period of time which would be several times the normal cycle period for the instrument controlled by time delay relay 36. Each response of the instrument would reset time delay device 41. Upon emergence from an icing condition, the monitor would turn off the protection system by failing to re-energize the time delay relay 41. In this way, the instrument can act simultaneously as an icing rate meter and as a protection system operational monitor.

It will be apparent that cyclical de-icing systems utilize much less energy than do continuous or anti-icing systems because they can be designed to apply energy to but one section of the protected surface at a time. Mast 5 may be made of Teflon which is a tough plastic material or any other suitable material. Commutator 13 may be made of Teflon or any other suitable insulating material. Feeler 26 may be coated with a suitable material providing a hydrophobic, adhesion-resistant surface. Such a coating may be a fused Teflon coating.

It is to be understood that certain modifications, alterations and changes can be made without departing from the spirit and scope of the appended claims.

I claim:

1. An icing-condition detecting instrument for use with the ice-protection system for a surface exposed to icing-conditions in an air stream, comprising a mounting mast-member extending outwardly from the surface into the air stream, the leading edge of said mast-member having a heating means to prevent the accumulation of ice thereon, a disk member mounted for rotation on a shaft extending through said mast with the plane of the disk generally parallel to said air stream, motor means for rotating said disk at a predetermined constant speed, heater means in said disk, a second shaft extending through said mast to a point adjacent the surface of said disk within the periphery of said disk, an arm extending to the periphery of said disk secured to said second shaft, a feeler member secured to the end of said arm spaced a predetermined distance from the edge of said disk, said instrument including switch means actuated by said second shaft adapted to close an electric circuit when an accumulation of ice in excess of a predetermined space between said feeler member and the edge of said disk causes said feeler member to turn said second shaft about its axis, to give a signal indicative of an accumulation of ice in excess of said predetermined amounts and to energize said ice-protection system and said disk heater element.

2. The device as claimed in claim 1 in which the mounting mast-member is non-metallic.

3. An icing-condition detecting instrument for use with the ice-protection system for a surface exposed to icing conditions in an air stream, comprising a mounting mast-member extending outwardly from the surface into the air stream, a disk member mounted for rotation on a shaft extending through said mast with the plane of the disk generally parallel to said air stream, motor means for rotating said disk at a predetermined constant speed, heater means in said disk, a second shaft extending through said mast to a point adjacent the surface of said disk within its periphery, an arm extending to the periphery of said disk secured to said second shaft, a feeler member secured to the end of said arm spaced a predetermined distance from the edge of said disk, said instrument including switch means actuated by said second shaft adapted to close an electric circuit when an accumulation of ice in excess of a predetermined space between said feeler member and the edge of said disk causes said feeler member to turn said second shaft about its axis, thereby giving a signal indicative of an accumulation of ice in excess of said predetermined amount.

4. An icing-condition detecting instrument for use with the ice-protection system for a surface exposed to icing-conditions in an air stream, comprising a mounting mast-member extending outwardly from the surface into the air stream, a disk member mounted for rotation on a shaft extending through said mast with the plane of the disk generally parallel to said air stream, motor means for rotating said disk at a predetermined constant speed, heater means in said disk, a second shaft extending through said mast to a point adjacent the surface of said disk within its periphery, an arm extending to the periphery of said disk secured to said second shaft, a feeler member secured to the end of said arm spaced a predetermined distance from the edge of said disk, switch means actuated by said second shaft adapted to close an electric circuit when an accumulation of ice in excess of a predetermined space between said feeler member and the edge of said disk causes said feeler member to turn said second shaft about its axis, thereby giving a signal indicative of an accumulation of ice in excess of said predetermined amount, and means to supply current for de-icing said disk at intervals inversely proportionate to the rate of icing.

References Cited in the file of this patent

UNITED STATES PATENTS

| | | |
|---|---|---|
| 2,171,145 | Langley | Aug. 29, 1939 |
| 2,280,400 | Green | Apr. 21, 1942 |
| 2,427,778 | Gregg | Sept. 23, 1947 |
| 2,494,877 | Idrac | Jan. 17, 1950 |
| 2,566,813 | Thorsen | Sept. 4, 1951 |
| 2,585,604 | Vonnegut et al. | Feb. 12, 1952 |